United States Patent
Lim

(10) Patent No.: US 9,479,771 B2
(45) Date of Patent: Oct. 25, 2016

(54) USING MULTIPLE TRANSFORM/SUBBAND REPRESENTATIONS FOR VIDEO ENCODING

(71) Applicant: Jae S. Lim, Winchester, MA (US)

(72) Inventor: Jae S. Lim, Winchester, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 365 days.

(21) Appl. No.: 14/155,500

(22) Filed: Jan. 15, 2014

(65) Prior Publication Data

US 2014/0126650 A1   May 8, 2014

Related U.S. Application Data

(63) Continuation of application No. 11/430,601, filed on May 9, 2006, now Pat. No. 8,687,698.

(51) Int. Cl.
| | |
|---|---|
| H04N 7/12 | (2006.01) |
| H04N 11/02 | (2006.01) |
| H04N 11/04 | (2006.01) |
| H04N 19/103 | (2014.01) |
| H04N 19/63 | (2014.01) |
| H04N 19/61 | (2014.01) |
| H04N 19/60 | (2014.01) |
| H04N 19/18 | (2014.01) |

(52) U.S. Cl.
CPC ...... *H04N 19/00018* (2013.01); *H04N 19/103* (2014.11); *H04N 19/18* (2014.11); *H04N 19/60* (2014.11); *H04N 19/61* (2014.11); *H04N 19/63* (2014.11)

(58) Field of Classification Search
None
See application file for complete search history.

(56) References Cited

U.S. PATENT DOCUMENTS 5,048,111 A   9/1991   Jones et al.

OTHER PUBLICATIONS

Pratt, W. K., Digital Image Processing, John Wiley and Sons (1991).
Gonzales et al., Digital Image Processing, Addison-Wesley (1992).
Tekalp, Digital Video Processing, Prentice Hall (1995).
Mitchell et al., MPEG Video Compression Standard, Chapman and Hall, International Thomson Publishing (1996).
Strang et al., Wavelets and Filter Banks, Wellesley-Cambridge Press (1996).
Haskell et al., Digital Video: An Introduction to MPEG-2, Chapman and Hall, International Thomson Publishing (1997).
Richardson, Video Codec Design, John Wiley and Sons (2003).
Malvar, Signal Processing with Lapped Transforms, Artech House, Norwood, MA (1992).
Vetterli et al., Wavelets and Subband Coding, Prentice Hall, Englewood Cliffs, NJ (1995).
Lim, Two-Dimensional Signal and Image Processing, Prentice Hall, Englewood, NJ (1990).

(Continued)

*Primary Examiner* — Geepy Pe
(74) *Attorney, Agent, or Firm* — Occhiuti & Rohlicek LLP

(57) ABSTRACT

A method of encoding a sequence of video frames, comprising receiving a sequence of video frames, encoding at least a first portion of the sequence of frames using the first type of transform/subband representation to produce first transform/subband coefficients, encoding at least a second portion of the sequence of frames using the second type of transform/subband representation to produce second transform/subband coefficients; and providing the first and second transform/subband coefficients at an output.

100 Claims, 4 Drawing Sheets

(56) References Cited

OTHER PUBLICATIONS

Malvar et al., The Lot: transform coding without blocking effects, IEEE Transactions on Acoustics, Speech and Signal Processing, vol. 37, No. 4, pp. 553-559 (Apr. 1989).

Baylon et al., Transform/Subband Analysis and Synthesis of Signals, pp. 540-544, $2^{nd}$ Int. Symposium on Signal Processing and Its Applications, Gold Coast, Australia (Aug. 24-30, 1990).

The Grand Alliance, The U.S. HDTV Standard, IEEE Spectrum, pp. 36-45 (Apr. 1995).

Wiegand et al., Overview of the H.264/AVC Video Coding Standard, IEEE Transactions on Circuits and Systems for Video Technology (Jul. 2003).

List et al., Adaptive Deblocking Filter, IEEE Transactions on Circuits and Systems for Video Technology, vol. 13, No. 7, pp. 614-619 (Jul. 2003).

Ostermann et al., Video coding with H.264/AVC: Tools, Performance, and Complexity, IEEE Circuits and Systems Magazine, First Quarter, pp. 7-28 (2004).

USING MULTIPLE TRANSFORM/SUBBAND REPRESENTATIONS FOR VIDEO ENCODING

CROSS-REFERENCE TO RELATED APPLICATION

This application is a continuation of and claims priority to U.S. application Ser. No. 11/430,601, filed on May 9, 2006, incorporated herein by reference.

TECHNICAL FIELD

This invention relates to compression of video image frames, e.g., television frames.

BACKGROUND

Video (e.g., television) consists of a sequence of image frames. In modern video storage and transmission systems, the image frames are converted to digital bits ("encoded"). Various encoding techniques are employed to reduce the number of bits used (or to improve image quality for the same number of bits). To view a video, the digital bits are converted back to image frames ("decoded"), which are presented on a display.

A common encoding technique uses motion compensation, in which an estimate is made of the magnitude and direction of motion of an image from one frame to the next, to provide an estimate of the next frame, and only the difference between the estimate and the actual frame (the "motion-compensated residual") is encoded. The amplitude of the residual will generally be much smaller than the intensity of the image, itself, and so fewer bits are needed for accurate encoding. Motion compensation can be used for all or just a portion of a frame.

Another common encoding technique, often used in conjunction with motion compensation, is transforming the intensity of the image (or the amplitude of the residual) to, e.g., a spatial frequency domain, and then digitizing the transform coefficients. For the same number of bits, transform encoding generally produces a higher quality image.

When image intensity is transformed and digitized, it is called "intra-frame" coding, as only information from the same frame is used. When residual amplitude is transformed and coded it is called "inter-frame" coding, as information from the current and at least one prior frame is used.

There are various advantages in using intra-frame coding. For example, because intra-frame coding does not involve other frames, it can be decoded without decoding other frames. This can be useful when a viewer changes television channels. In the United States digital television standard, an entire frame, referred to as an I-frame, is periodically encoded using intra-frame coding. When a channel change occurs, the television receiver can wait for the I-frame and begin decoding from that frame. It is also useful for VCR or DVD type applications, wherein only I-frames may be decoded to provide images during fast-forwarding. Also, intra-frame coding reduces the effect of error propagation, because errors that occurred in other frames do not affect intra-frame coded regions.

On the other hand, inter-frame encoding is very useful in reducing the bit rate for some image regions. As noted above, motion compensation takes advantage of the fact that scenes often do not change substantially from one frame to the next, and thus once the previous frame is decoded, it can be used to predict portions of the current frame. By encoding only image aspects that cannot be predicted, the bit rate used can be significantly reduced. Except for the I-Frame, in which the entire frame uses only intra-frame coding, some portions of a typical video frame are encoded using intra-frame coding (when motion prediction is not good) and other regions are encoded using inter-frame coding.

The transform that is used in video compression is typically the discrete cosine transform (DCT), which is a block-based transform. The image is divided into many non-overlapping blocks (typically the sizes are 8×8 or 16×16 pixels), and the DCT coefficients of the image intensity, in the case of intra-frame coding, and the motion-compensated residual, in the case of inter-frame coding, are quantized. An advantage of using a non-overlapping region transform (non-ORT) such as the DCT is that each block can be treated separately from other blocks, thus making it simple to mix intra-frame coded blocks and inter-frame coded blocks to form a complete frame.

A significant disadvantage of non-ORTs is the occurrence of blocking artifacts. Because the blocks are treated separately and the image is not perfectly reconstructed after compression, discontinuities can occur along the block boundaries. This becomes particularly evident when the bit rate is low (compression is high). Once the blocking effects occur, they can propagate to other frames as a result of inter-frame coding.

An approach to reducing the effects of blocking artifacts is to use an overlapping region transform (ORT), in which there is overlap in the regions transformed. This can increase the number of transform coefficients to encode, however, as the overlapped regions are represented more than once. But some ORTs, e.g., the lapped orthogonal transform (LOT), utilizes overlapping regions without increasing the number of coefficients relative to DCT.

Transform representations such as the DCT and LOT are related to subband representation. For a subband representation, a signal such as an image or a residual, is filtered by a set of filters, and the results are subsampled. The filtered and subsampled signals are the subband representation of the signal. We will refer to the filtered and subsampled signal as the subband coefficients. The filters used are called analysis filters because they are used in analyzing the signal. A different set of filters, of course, results in different subband coefficients for the same signal. In an image or video compression system based on a subband representation, the subband coefficients are quantized and the quantized coefficients are transmitted in applications such as digital television or stored in a storage medium in applications such as DVD.

The quantized subband coefficients can be used to reconstruct an estimate of the original signal by interpolation and filtering with a set of filters. The filters used in this process are called the synthesis filters. If we choose an appropriate set of analysis and synthesis filters, and perform the appropriate subsampling and interpolation functions, it is possible to reconstruct the original signal exactly from the unquantized subband coefficients. Because of the quantization process which is necessary in a typical image or video compression application, the reconstructed signal is only an estimate (approximation) of the original signal. A block diagram of a conventional signal compression system based on subband representation is shown in FIG. 1 and FIG. 2.

The transform coefficients and subband coefficients of the same signal may be very simply related to each other. For example, the DCT coefficients of a signal can be simply related one-to-one to the subband coefficients by choosing an appropriate set of analysis filters. For this reason, we will refer to the transform representation and subband representation collectively as the transform/subband representation. The transform coefficients and subband coefficients will be collectively referred to as transform/subband coefficients. The DCT and LOT are examples of the transform/subband representations.

SUMMARY

In general, the invention features a method of encoding a sequence of video frames, comprising receiving a sequence of video frames, encoding at least a first portion of the sequence of frames using the first type of transform/subband representation to produce first transform/subband coefficients, encoding at least a second portion of the sequence of frames using the second type of transform/subband representation to produce second transform/subband coefficients; and providing the first and second transform/subband coefficients at an output.

Preferred implementations of this aspect of the invention may incorporate one or more of the following. The first type and second type of transform/subband representation may be used for encoding a first and a second frame, respectively, so that the type of transform/subband representation differs from frame to frame. The first type of transform/subband representation may be used for encoding I-frames in a communication system, and the second type of transform/subband representation may be used for encoding B and P-frames in the communication system. The first type may be an LOT representation and the second type may be a DCT representation. The first type and second type of transform/subband representation may be used for encoding within a first region and within a second region, respectively, of the same frame, so that the type of transform/subband representation differs from region to region within the same frame. The first region may have primarily inter-frame coded blocks and the second region may have primarily intra-frame coded blocks. The first type of transform/subband representation may be an ORT representation, and the first region may contain either all inter-frame coded blocks or all intra-frame coded blocks. The first and second regions both may contain only inter-frame blocks. The first type of transform/subband representation, which is used in the first region containing primarily inter-frame coded blocks, may be a Non-ORT, and the second type of transform/subband representation, which is used in the second region containing primarily intra-frame coded blocks, may be an ORT. The first type of transform/subband representation, which is used in the first region containing primarily inter-frame coded blocks, may be an ORT, and the second type of transform/subband representation, which is used in the second region containing primarily intra-frame coded blocks, may be a Non-ORT. At least one of the first type and second type of transform/subband representation may be a subband representation. The first type of transform/subband representation may be a Non-ORT and the second type of transform/subband representation may be an ORT. The Non-ORT may be a DCT. The invention further comprises the step of quantizing the transform/subband coefficients. The ORT may use approximately the same number of coefficients as the Non-ORT. The invention further comprises providing identification information along with the transform/subband coefficients to identify at least one of the first and second type of transform/subband representations. Identification information to identify the type of transform/subband representation used for the first or second portion of the signal may not be supplied with the transform/subband coefficients, as the identity of the representation will be known to a decoder. At least a third portion of the signal may be encoded with a third type of transform/subband representation different from the first and second types.

The invention's use of different transform/subband representations for different parts of a signal has considerable advantages. For example, in a video compression system such as in a digital television receiver, the I-frame can be coded with the LOT representation, thereby reducing blocking artifacts, and the B and P-frames can be coded using the DCT representation. Using the same transform/subband representation for the B and P-frames simplifies the mix of intra-frame coding for some blocks and inter-frame coding for some other blocks.

The invention's use of different transform/subband representations for different regions of the same frame, e.g., for the inter-frame and intra-frame regions, also has advantages. E.g., DCT can be used for intra-frame coded blocks, and another non-ORT transform, for inter-frame coded blocks. Thus, different transform/subband representations may be used for different regions of the B and P-frames. There are many other non-ORT transforms available, such as the Discrete Fourier Transform and the Haddamard transform. Since the characteristics of the signal intensity (intra-frame coding) are different from the residual amplitude (inter-frame coding), one non-ORT may work well for the intra-frame coded blocks and another non-ORT may work well for the inter-frame coded blocks.

There may even be an advantage to using different transform/subband representations within the intra-frame coded regions or within the inter-frame coded regions. The characteristics of image intensity and residual amplitude vary considerably for different regions of the image or video signal, and different transform/subband representations may be useful for different regions.

The specific choice of the transform/subband representation may or may not have to be encoded depending on the circumstances. For example, if it is decided to use the LOT for I-frames and the DCT for B and P-frames, and this information is available to the decoder, the decoder already has information on which frame is an I-frame, a B-frame, or a P-frame in a typical video compression system, and the decoder does not need additional information because of the use of more than one transform/subband representation.

If the decoder does not have information concerning which regions are coded with what transform/subband representation, this information needs to be encoded. In a typical system that utilizes more than one transform/subband representation for a signal, a set of transform/subband representations is predetermined and the encoder needs to encode only the information needed by the decoder to identify which representation within the set is used for that particular region of the signal. The set typically would contain only a reasonable number of the transform/subband representations, since more representations will involve a higher bit rate to code the information and the higher bit rate may not justify the additional increase in performance. More transform/subband representations may also involve more computations at the encoder to decide which transform/subband representation to use.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
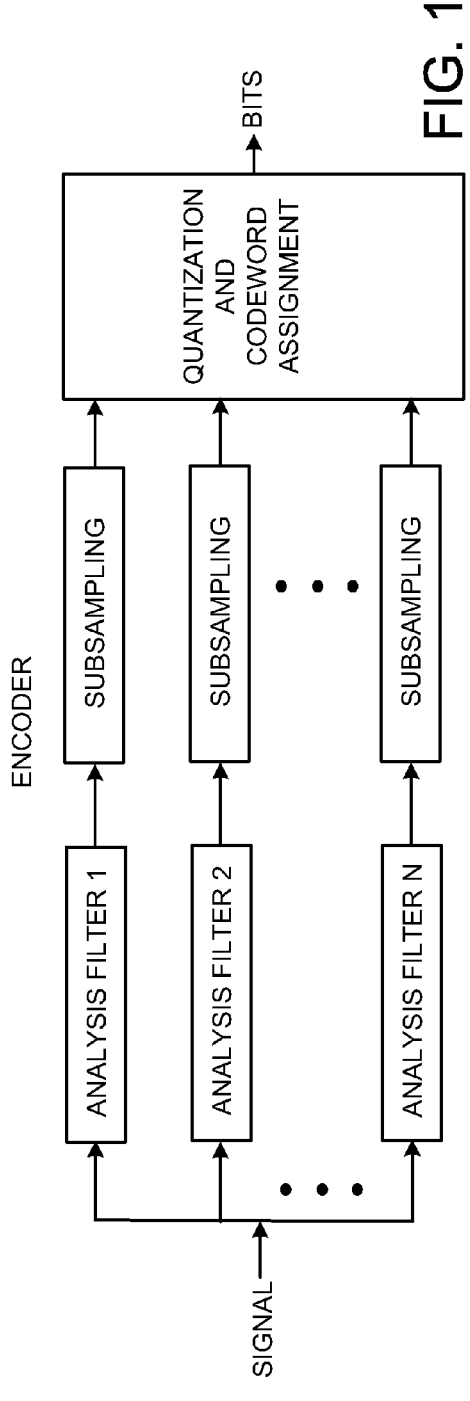
FIG. 1 is a block diagram of a prior art encoder.
Figure 2:
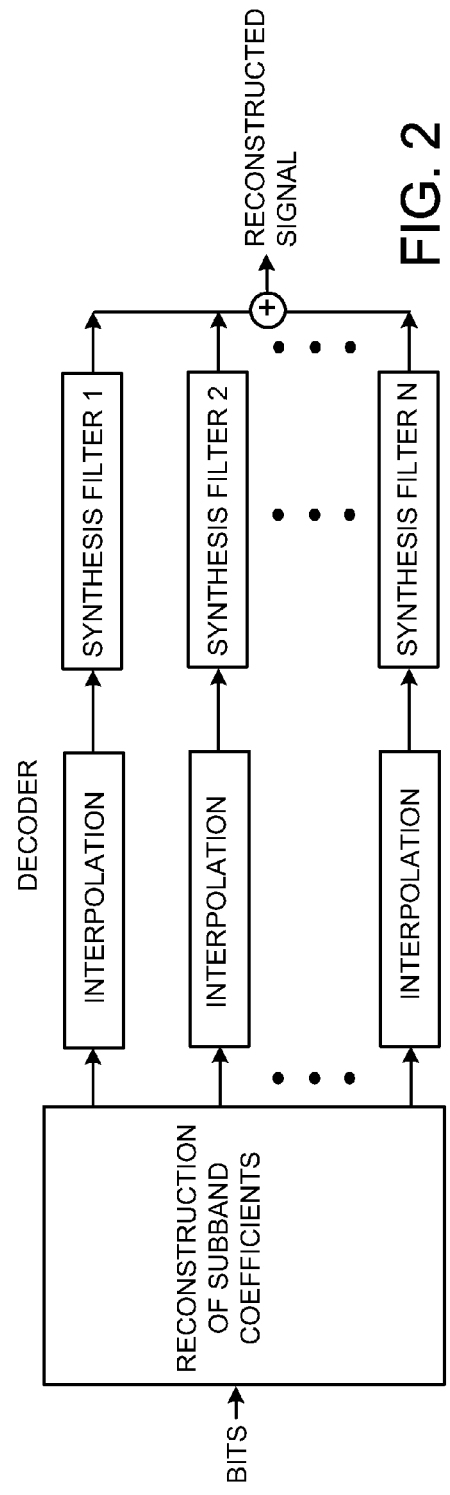
FIG. 2 is a block diagram of a prior art decoder.
Figure 3:
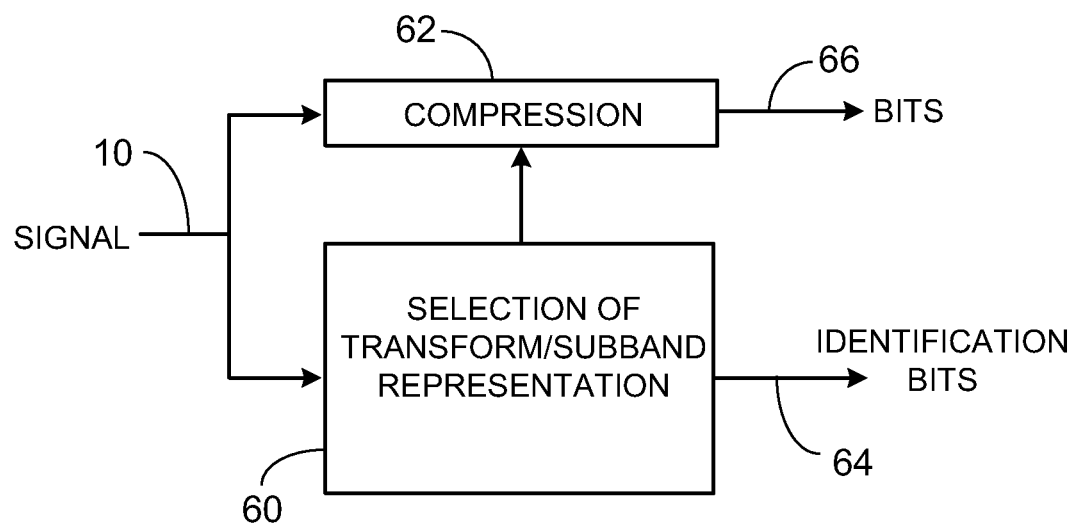
FIG. 3 is a block diagram of a portion of the encoder of one implementation of the invention.
Figure 4:
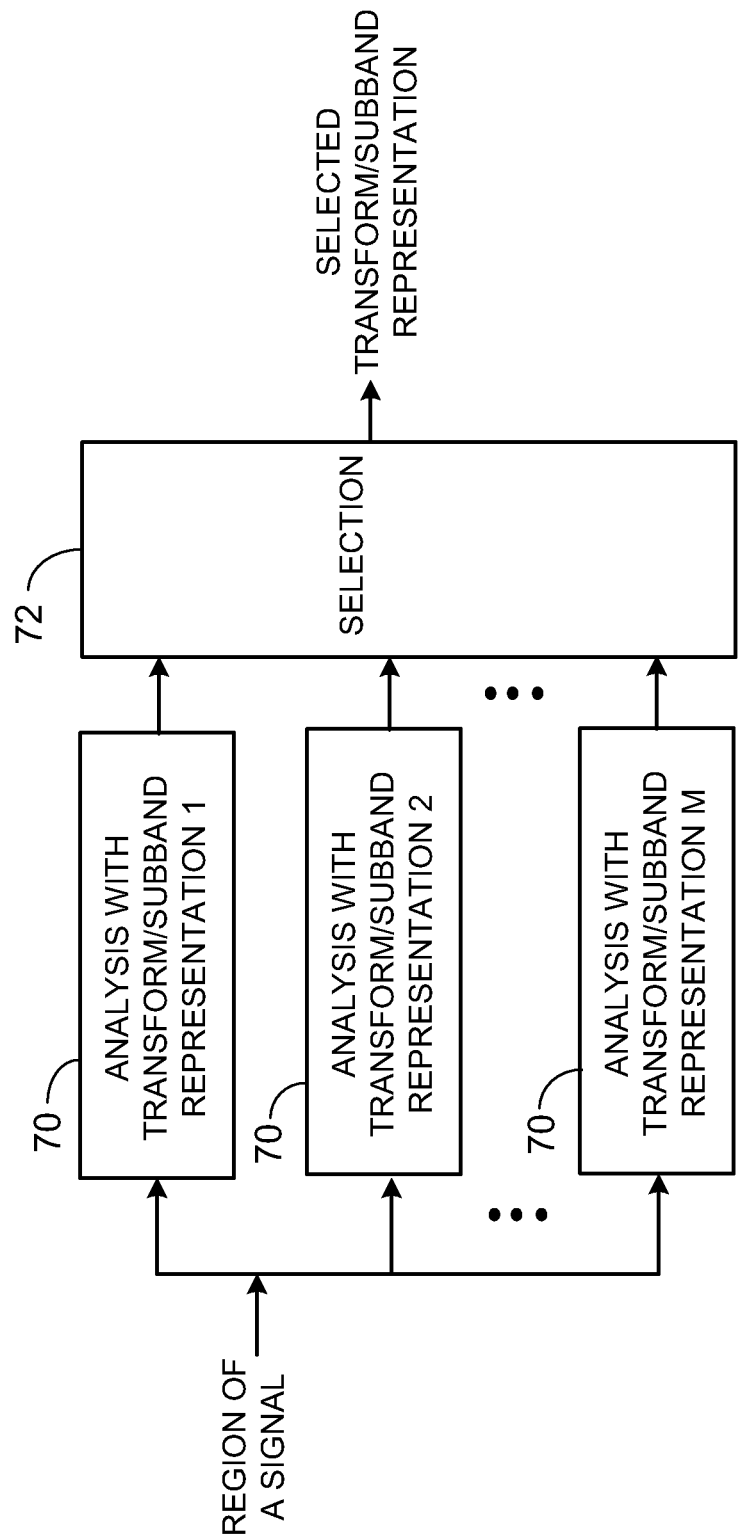
FIG. 4 is a block diagram of a portion of the processing that may be done in the implementation of FIG. 3 to select the different transform/subband representations used to encode the signal.

One implementation of an encoder is shown in FIGS. 3-4. The video signal 10 is processed at selection block 60 to select different transform/subband representations for different regions of the signal. The selected transform/subband representations are used to compress (62) the signal to form the encoded signal 66. Identification bits 64 can be provided by the encoder in some implementations, and used by the decoder to determine the specific transform/subband representations used for different regions of the signal.

An example of a process that may be used to select the transform/subband representations is shown in FIG. 4. A region of interest in the signal is analyzed by each of M different transform/subband representations 70. The results of the analysis are compared (72), and the transform/subband representations are selected (72) based on the comparison. The specific analysis and selection criterion can vary depending on the situation. In video compression, for example, one can encode the signal with the different transform/selection representations and reconstruct the signal. One can then select the transform/subband representation that gives the least mean-squared-error between the signal that is encoded and the reconstructed signal at the same bit rate requirement or which requires the least bit rate at the same level of the mean-squared error. There are, of course, many other possibilities of the analysis and selection method. There are also many possible variations. For example, several different neighboring regions may be considered jointly to determine the best transform/subband representation for different regions of the signal instead of determining the best transform/subband representation independently for each region.

The selection process of FIG. 4 does not necessarily have to be performed in real time in many implementations, as the choice of transform/subband representation may be made in advance. A system may be designed that uses one representation for the entirety of one type of frame (e.g., an I-frame) or one type of block within a frame (e.g., intra-frame coded block), and uses another representation for the entirety of another type of frame (e.g., a B or P-frame) or another type of block within a frame (e.g., an inter-frame coded block).

The transform/subband representations used are preferably representations that comply with the critical sampling property, so that if one starts with N intensity pixels, one ends up with N coefficients, but other representations may also be used.

Figure 5:
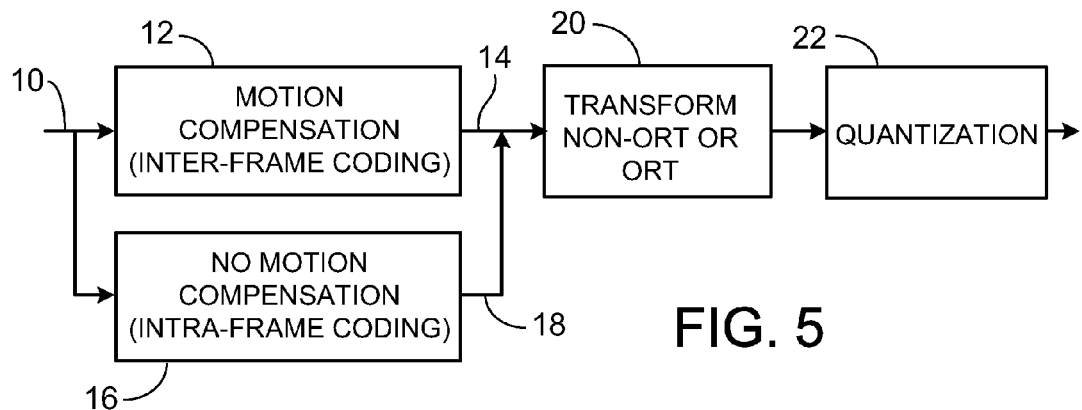
FIG. 5 is a block diagram of a portion of the encoder of another implementation of the invention.

FIG. 5 shows another implementation, in which different transform/subband representations are used for different regions within the same image frame. All or a portion of a frame may be motion compensated (12) to provide a motion-compensated residual 14 (inter-frame coding), or motion compensation may be skipped (16) (intra-frame coding). Either the residual amplitude 14 or the image intensity 18 is then transformed (20) into transform/subband coefficients, which are quantized (22). Various different types of transform/subband representations may be used.

Figure 6:
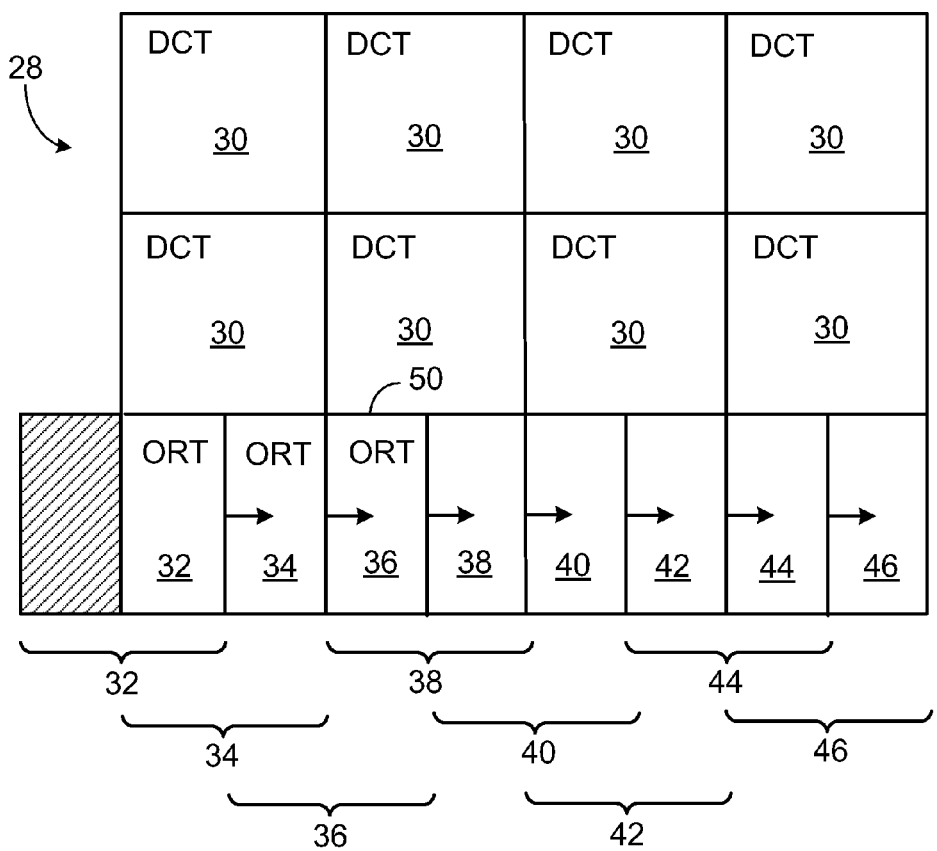
FIG. 6 is a simplified diagram showing the manner in which the implementation of FIG. 5 uses different transform/subband representations within the same frame.

FIG. 6 shows a simplified example of using two different types of transform/subband representations within the same frame 28, which is 24 pixels high and 32 pixels wide. The upper portion of the frame (16×32 pixels) is divided into eight blocks 30, each of which are 8×8 pixels. Each block 30 is transformed using a DCT to produce corresponding 8×8 blocks of sixty-four transform coefficients. The pixels of blocks 30 could represent residual amplitude (in the case of motion compensation) or image intensity (in the case of no motion compensation). The DCT is a non-overlapping region transform (Non-ORT) that produces as an output the same number of transform/subband coefficients as it is supplied as input. In the example in FIG. 6, there are sixty-four intensity or residual amplitude pixels supplied as input to the transform, and sixty-four transform/subband coefficients are derived from them. In FIG. 6 the Non-ORT blocks 30 are the same size as the ORT blocks 32-46, but this need not be the case.

The lower portion of the frame (8×32 pixels) is divided into eight 8×8 overlapping blocks 32-46, which are transformed using an overlapping region transform (ORT). The blocks sweep from left to right in the direction suggested by the arrows. Boundary 50 divides the upper portion of the frame in which a Non-ORT transform is used from the lower portion where an ORT transform is used. The boundary extends along the direction of sweep of the overlapping blocks in the portion undergoing ORT transformation. The brackets below the frame are provided to help identify the location of the overlapping blocks. Each of the overlapping blocks 32-46 contains sixty-four pixels (8×8), but produces only thirty-two transform/subband coefficients. For example, block 34, which consists of a 8×8 block of sixty-four pixels produces thirty-two coefficients. Overlapping blocks increases the number of blocks, but this increase is compensated for by the reduction in the number of coefficients obtained from a block.

The ORT-transformed portion of the frame (the lower 8×32 portion) should normally be either all inter-frame coded or all intra-frame, as the overlapping nature of the transform would typically create difficulties if it crossed a boundary between inter-frame and intra-frame coded portions. But the Non-ORT transformed portion of the frame (the upper 16×32) may be a mixture of inter-frame and intra-frame coded blocks (e.g., some blocks 30 may be intra-frame coded, and other blocks 30 may be inter-frame coded). Because the DCT is a Non-ORT there is not a problem in crossing a boundary between inter-frame and intra-frame coded regions, as long as the boundary does not extend through a block (i.e., as long as generally the entirety of any one block is all inter-frame or all intra-frame).

The boundary between the Non-ORT and ORT regions runs horizontally in FIG. 6, but this need not be the case; the boundary can run in any direction, and need not even be a straight line, as long as the overlapping regions used by the ORT do not extend into the non-overlapping regions used by the Non-ORT. Of course, some departure from this rule about boundary location would be acceptable so long as it did not unacceptably degrade image quality.

As noted earlier, some implementations would include transform/subband identification information in the encoded video signal to indicate the type of transform/subband representations used, and the locations within a frame or sequence of frames where the transform/subband representations were used. For example, the identification information might be provided for each image region. But the identification of transform/subband representation could also be implicit; e.g., if the I-Frame were to use only one transform type, and there was agreement between an encoder and a decoder, the transform information does not need to be included as long as the decoder can determine that a frame is an I-Frame.

Many other implementations other than those described above are within the invention, which is defined by the following claims. As mentioned earlier, it is not possible to describe here all possible implementations of the invention.

Not all of the features described above and appearing in some of the claims below are necessary to practicing the invention. Only the features recited in a particular claim are required for practicing the invention described in that claim. Features have been intentionally left out of claims in order to describe the invention at a breadth consistent with the inventor's contribution. For example, although in some implementations, two different transform/subband representations are used in the same frame, this is not required to practice the invention of some claims, as it is possible for the same representation to be used across each frame, but different representations used for different frames.

Some of the claims refer to processing circuitry configured to accomplish a specified function. This includes devices having one or more processors executing software that includes instructions configured to accomplish the specified function. Some claims refer to such a configured processor more than once, in cases in which a plurality of functions must be accomplished. This does not mean that there is more than one physical processor (although there could be more than one), as one processor may execute a plurality of instructions to accomplish the plurality of specified functions.

The invention claimed is:

1. A method of encoding a sequence of video frames using an encoder, comprising:
   receiving a sequence of video frames;
   encoding at least a first portion of the sequence of frames using a first type of transform/subband representation to produce first transform/subband coefficients;
   encoding at least a second portion of the sequence of frames, different from the first portion of the sequence of frames, using a second type of transform/subband representation to produce second transform/subband coefficients, wherein the second type of transform/subband representation is different from the first type of transform/subband representation, and wherein the first type and second type of transform/subband representation are used for encoding within a first region and within a second region, respectively, of the same frame, so that the type of transform/subband representation differs from region to region within the same frame; and
   providing the first and second transform/subband coefficients at an output.

2. A method of decoding a sequence of encoded video frames using a decoder, comprising:
   receiving a sequence of first and second transform/subband coefficients representing a sequence of video frames;
   decoding the first transform/subband coefficients using a first type of transform/subband representation to produce first portions of the sequence of video frames;
   decoding the second transform/subband coefficients using a second type of transform/subband representation to produce second portions of the sequence of video frames, different from the first portions of the sequence of video frames, wherein the second type of transform/subband representation is different from the first type of transform/subband representation, and wherein the first type and second type of transform/subband representation are used for decoding within a first region and within a second region, respectively, of the same frame, so that the type of transform/subband representation differs from region to region within the same frame; and
   providing the first and second portions of the sequence of video frames at an output.

3. A communication system receiver for decoding a sequence of encoded video frames, comprising:
   processing circuitry configured to receive a sequence of first and second transform/subband coefficients representing a sequence of video frames;
   processing circuitry configured to decode the first transform/subband coefficients using a first type of transform/subband representation to produce first portions of the sequence of video frames;
   processing circuitry configured to decode the second transform/subband coefficients using a second type of transform/subband representation to produce second portions of the sequence of video frames, different from the first portions of the sequence of video frames, wherein the second type of transform/subband representation is different from the first type of transform/subband representation, and wherein the first type and second type of transform/subband representation are used for decoding within a first region and within a second region, respectively, of the same frame, so that the type of transform/subband representation differs from region to region within the same frame; and
   processing circuitry configured to provide the first and second portions of the sequence of video frames at an output.

4. The method of claim 1 wherein the first type and second type of transform/subband representation are used for encoding a first and a second frame, respectively, so that the type of transform/subband representation differs from frame to frame.

5. The method of claim 4 wherein the first type of transform/subband representation is used for encoding I-frames in a communication system, and the second type of transform/subband representation is used for encoding B and P-frames in the communication system.

6. The method of claim 1 wherein the first region has primarily inter-frame coded blocks and the second region has primarily intra-frame coded blocks.

7. The method of claim 1 wherein the first and second regions both contain only inter-frame coded blocks.

8. The method of claim 1 wherein the first type of transform/subband representation is a Non-ORT and the second type of transform/subband representation is a Non-ORT.

9. The method of claim 1 wherein the first type of transform/subband representation is a Non-ORT and the second type of transform/subband representation is an ORT.

10. The method of claim 9 wherein the Non-ORT is a DCT.

11. The method of claim 1 further comprising the step of quantizing the transform/subband coefficients.

12. The method of claim 1 further comprising providing identification information along with the transform/subband coefficients to identify at least one of the first and second type of transform/subband representations.

13. The method of claim 1 wherein identification information to identify the type of transform/subband representation used for the first or second portion of the sequence is not supplied with the transform/subband coefficients, as the identity of the representation will be known to a decoder.

14. The method of claim 1 wherein at least a third portion of the sequence is encoded with a third type of transform/subband representation different from the first and second types.

15. The method of claim 1 further comprising analyzing at least the first portion by each of multiple different transform/subband representations, comparing results of the analysis, and selecting the first type of transform/subband representation based on the comparison for encoding the first portion.

16. The method of claim 2 wherein the first type and second type of transform/subband representation are used for decoding a first and a second frame, respectively, so that the type of transform/subband representation differs from frame to frame.

17. The method of claim 16 wherein the first type of transform/subband representation is used for decoding I-frames in a communication system, and the second type of transform/subband representation is used for decoding B and P-frames in the communication system.

18. The method of claim 2 wherein the first region has primarily inter-frame coded blocks and the second region has primarily intra-frame coded blocks.

19. The method of claim 2 wherein the first and second regions both contain only inter-frame coded blocks.

20. The method of claim 2 wherein the first type of transform/subband representation is a Non-ORT and the second type of transform/subband representation is a Non-ORT.

21. The method of claim 2 wherein the first type of transform/subband representation is a Non-ORT and the second type of transform/subband representation is an ORT.

22. The method of claim 21 wherein the Non-ORT is a DCT.

23. The method of claim 2 further comprising the step of quantizing the transform/subband coefficients.

24. The method of claim 2 further comprising providing identification information along with the transform/subband coefficients to identify at least one of the first and second type of transform/subband representations.

25. The method of claim 2 wherein identification information to identify the type of transform/subband representation used for the first or second portion of the sequence is not supplied with the transform/subband coefficients, as the identity of the representation will be known to a decoder.

26. The method of claim 2 wherein at least a third portion of the sequence is encoded with a third type of transform/subband representation different from the first and second types.

27. The receiver of claim 3 wherein the first type and second type of transform/subband representation are used for decoding a first and a second frame, respectively, so that the type of transform/subband representation differs from frame to frame.

28. The receiver of claim 27 wherein the first type of transform/subband representation is used for decoding I-frames in a communication system, and the second type of transform/subband representation is used for decoding B and P-frames in the communication system.

29. The receiver of claim 3 wherein the first region has primarily inter-frame coded blocks and the second region has primarily intra-frame coded blocks.

30. The receiver of claim 3 wherein the first and second regions both contain only inter-frame coded blocks.

31. The receiver of claim 3 wherein the first type of transform/subband representation is a Non-ORT and the second type of transform/subband representation is a Non-ORT.

32. The receiver of claim 3 wherein the first type of transform/subband representation is a Non-ORT and the second type of transform/subband representation is an ORT.

33. The receiver of claim 32 wherein the Non-ORT is a DCT.

34. The receiver of claim 3 further comprising the step of quantizing the transform/subband coefficients.

35. The receiver of claim 3 further comprising providing identification information along with the transform/subband coefficients to identify at least one of the first and second type of transform/subband representations.

36. The receiver of claim 3 wherein identification information to identify the type of transform/subband representation used for the first or second portion of the sequence is not supplied with the transform/subband coefficients, as the identity of the representation will be known to a decoder.

37. The receiver of claim 3 wherein at least a third portion of the signal is encoded with a third type of transform/subband representation different from the first and second types.

38. The method of claim 8 wherein the first type of transform/subband representation is a DCT, and the second type of transform/subband representation is a DFT.

39. The method of claim 1 wherein the first type of transform/subband representation and the second type of transform/subband representation are used for encoding a B-frame.

40. The method of claim 39 wherein the first type of transform/subband representation is a DCT.

41. The method of claim 40 wherein the second type of transform/subband representation is a DFT.

42. The method of claim 39 wherein the first type of transform/subband representation is a Non-ORT and the second type of transform/subband representation is a Non-ORT.

43. The method of claim 42 wherein the first type of transform/subband representation is a DCT.

44. The method of claim 43 wherein the second type of transform/subband representation is a DFT.

45. The method of claim 39 further comprising providing identification information along with the transform/subband coefficients to identify at least one of the first and second type of transform/subband representations.

46. The method of claim 39 wherein identification information to identify the type of transform/subband representation used for the first or second portion of the sequence is not supplied with the transform/subband coefficients, as the identity of the representation will be known to a decoder.

47. The method of claim 1 wherein the first type of transform/subband representation and the second type of transform/subband representation are used for encoding a P-frame.

48. The method of claim 47 wherein the first type of transform/subband representation is a DCT.

49. The method of claim 48 wherein the second type of transform/subband representation is a DFT.

50. The method of claim 47 wherein the first type of transform/subband representation is a Non-ORT and the second type of transform/subband representation is a Non-ORT.

51. The method of claim 50 wherein the first type of transform/subband representation is a DCT.

52. The method of claim 51 wherein the second type of transform/subband representation is a DFT.

53. The method of claim 1 wherein the first type of transform/subband representation and the second type of transform/subband representation are used for encoding intra-frame coded blocks.

54. The method of claim 53 wherein the first type of transform/subband representation is a DCT.

55. The method of claim 54 wherein the second type of transform/subband representation is a DFT.

56. The method of claim 53 wherein the first type of transform/subband representation is a Non-ORT and the second type of transform/subband representation is a Non-ORT.

57. The method of claim 56 wherein the first type of transform/subband representation is a DCT.

58. The method of claim 57 wherein the second type of transform/subband representation is a DFT.

59. The method of claim 20 wherein the first type of transform/subband representation is a DCT, and the second type of transform/subband representation is a DFT.

60. The method of claim 2 wherein the first type of transform/subband representation and the second type of transform/subband representation are used for decoding a B-frame.

61. The method of claim 60 wherein the first type of transform/subband representation is a DCT.

62. The method of claim 61 wherein the second type of transform/subband representation is a DFT.

63. The method of claim 60 wherein the first type of transform/subband representation is a Non-ORT and the second type of transform/subband representation is a Non-ORT.

64. The method of claim 63 wherein the first type of transform/subband representation is a DCT.

65. The method of claim 64 wherein the second type of transform/subband representation is a DFT.

66. The method of claim 60 further comprising providing identification information along with the transform/subband coefficients to identify at least one of the first and second type of transform/subband representations.

67. The method of claim 60 wherein identification information to identify the type of transform/subband representation used for the first or second portion of the sequence is not supplied with the transform/subband coefficients, as the identity of the representation will be known to a decoder.

68. The method of claim 2 wherein the first type of transform/subband representation and the second type of transform/subband representation are used for decoding a P-frame.

69. The method of claim 68 wherein the first type of transform/subband representation is a DCT.

70. The method of claim 69 wherein the second type of transform/subband representation is a DFT.

71. The method of claim 68 wherein the first type of transform/subband representation is a Non-ORT and the second type of transform/subband representation is a Non-ORT.

72. The method of claim 71 wherein the first type of transform/subband representation is a DCT.

73. The method of claim 72 wherein the second type of transform/subband representation is a DFT.

74. The method of claim 2 wherein the first type of transform/subband representation and the second type of transform/subband representation are used for decoding intra-frame coded blocks.

75. The method of claim 74 wherein the first type of transform/subband representation is a DCT.

76. The method of claim 75 wherein the second type of transform/subband representation is a DFT.

77. The method of claim 74 wherein the first type of transform/subband representation is a Non-ORT and the second type of transform/subband representation is a Non-ORT.

78. The method of claim 77 wherein the first type of transform/subband representation is a DCT.

79. The method of claim 78 wherein the second type of transform/subband representation is a DFT.

80. The receiver of claim 31 wherein the first type of transform/subband representation is a DCT, and the second type of transform/subband representation is a DFT.

81. The receiver of claim 3 wherein the first type of transform/subband representation and the second type of transform/subband representation are used for decoding a B-frame.

82. The receiver of claim 81 wherein the first type of transform/subband representation is a DCT.

83. The receiver of claim 82 wherein the second type of transform/subband representation is a DFT.

84. The receiver of claim 83 wherein the first type of transform/subband representation is a Non-ORT and the second type of transform/subband representation is a Non-ORT.

85. The receiver of claim 84 wherein the first type of transform/subband representation is a DCT.

86. The receiver of claim 85 wherein the second type of transform/subband representation is a DFT.

87. The receiver of claim 81 further comprising providing identification information along with the transform/subband coefficients to identify at least one of the first and second type of transform/subband representations.

88. The receiver of claim 81 wherein identification information to identify the type of transform/subband representation used for the first or second portion of the sequence is not supplied with the transform/subband coefficients, as the identity of the representation will be known to a decoder.

89. The receiver of claim 3 wherein the first type of transform/subband representation and the second type of transform/subband representation are used for decoding a P-frame.

90. The receiver of claim 89 wherein the first type of transform/subband representation is a DCT.

91. The receiver of claim 90 wherein the second type of transform/subband representation is a DFT.

92. The receiver of claim 89 wherein the first type of transform/subband representation is a Non-ORT and the second type of transform/subband representation is a Non-ORT.

93. The receiver of claim 92 wherein the first type of transform/subband representation is a DCT.

94. The receiver of claim 93 wherein the second type of transform/subband representation is a DFT.

95. The receiver of claim 3 wherein the first type of transform/subband representation and the second type of transform/subband representation are used for decoding intra-frame coded blocks.

96. The receiver of claim 95 wherein the first type of transform/subband representation is a DCT.

97. The receiver of claim 96 wherein the second type of transform/subband representation is a DFT.

98. The receiver of claim 95 wherein the first type of transform/subband representation is a Non-ORT and the second type of transform/subband representation is a Non-ORT.

99. The receiver of claim 98 wherein the first type of transform/subband representation is a DCT.

100. The receiver of claim 99 wherein the second type of transform/subband representation is a DFT.

* * * * *